(No Model.) 2 Sheets—Sheet 1.
P. NAEF.
ROTARY FURNACE.
No. 596,533. Patented Jan. 4, 1898.
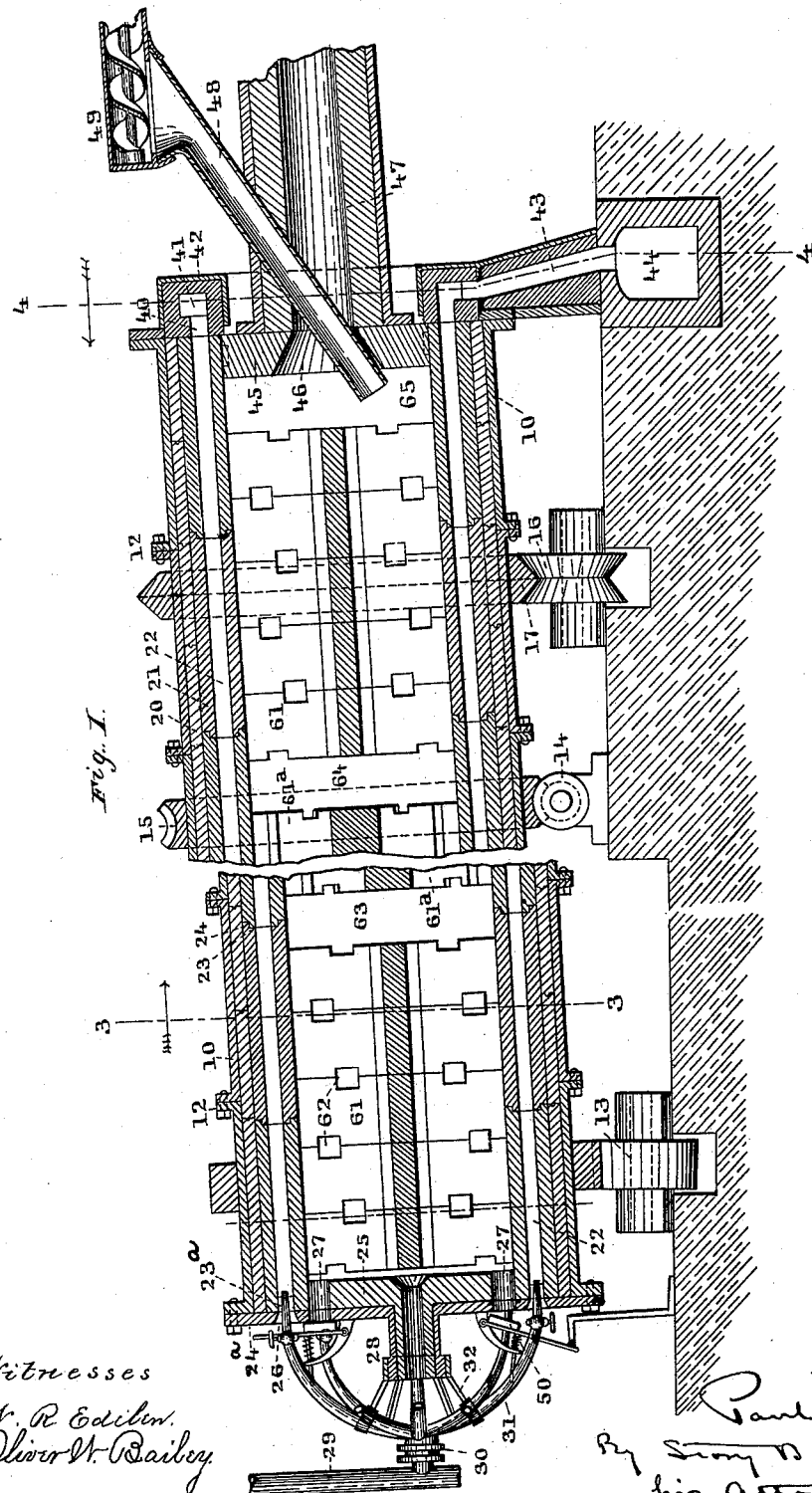
Fig. I.
Witnesses
W. R. Ediliw.
Oliver W. Bailey.
Inventor.

(No Model.) 2 Sheets—Sheet 2.

P. NAEF.
ROTARY FURNACE.

No. 596,533. Patented Jan. 4, 1898.

Witnesses.
W. R. Edelen.
Oliver W. Bailey.

Inventor
Paul Naef
By his attorney

UNITED STATES PATENT OFFICE.

PAUL NAEF, OF ARGENTINE, KANSAS.

ROTARY FURNACE.

SPECIFICATION forming part of Letters Patent No. 596,533, dated January 4, 1898.

Application filed April 11, 1894. Renewed June 11, 1897. Serial No. 640,398. (No model.)

*To all whom it may concern:*

Be it known that I, PAUL NAEF, a citizen of Switzerland, residing at Argentine, in the county of Wyandotte and State of Kansas, have invented certain new and useful Improvements in Rotary Furnaces; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The present invention relates to the class of rotary furnaces applicable to the treatment of solids with gases, and it is specially valuable for the roasting or drying of ores and the decomposing of various chlorids—as, for example, magnesium oxychlorid—with air or other gases for the manufacture of chlorin products. It is also applicable for carrying out reactions based on catalytical action—for example, the production of sulfuric acid by treating sulfurous-acid gas with metallic oxids or platinum-black at high temperatures; and the object of the invention is to provide an improved rotary furnace primarily intended to be used with heating-flues independent of the reaction-chamber, so that the fire-gas need not be mixed with the gas produced by the decomposition of the ore or other material, a furnace which will allow access to be had to all parts thereof for repair, and which will afford a most intimate contact between the solid material treated and the gas and will therefore effect as complete a decomposition of the solid material as possible with a small excess of air or other gas.

The invention consists of the improved furnace as hereinafter described and claimed, the main features of the same being primarily a rotary-cylinder furnace with fire-flues for heating the same and gas or oil burners for the fire-flues, also a construction which admits of access being had to all parts of the interior of the rotary cylinder for repair, and, further, certain details of construction and arrangement.

Figure 2:
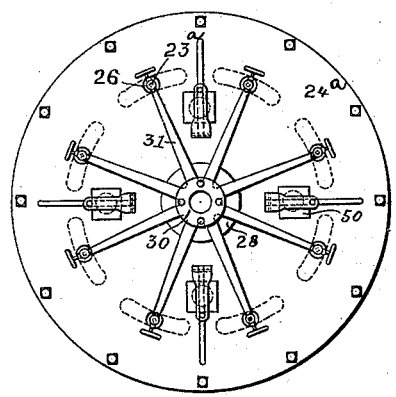
Figure 3:
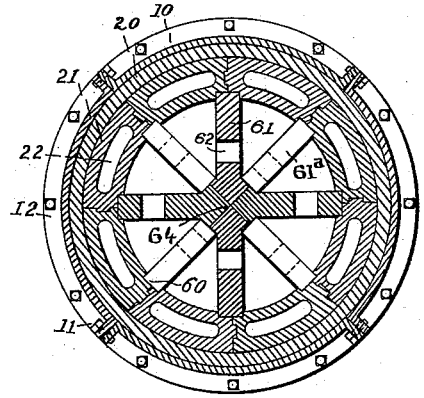
Figure 5:
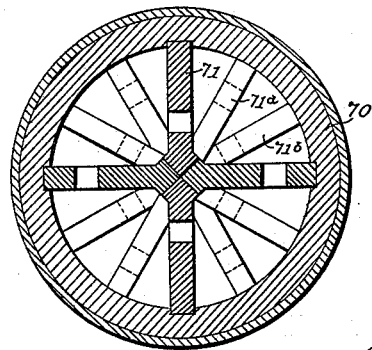
Figure 6:
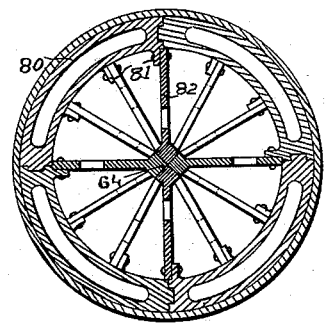
Figure 4:
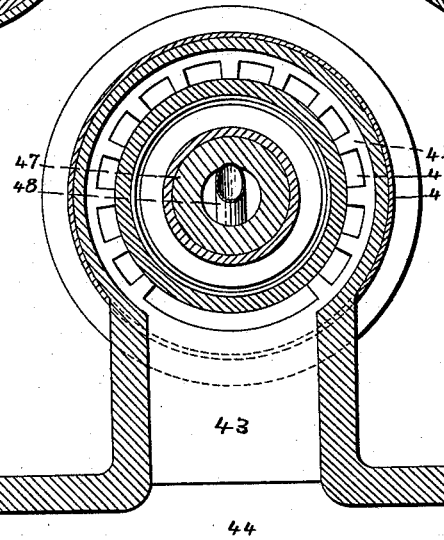

In the accompanying drawings, Figure 1 is a longitudinal sectional view of a rotary-cylinder furnace embodying the features of the present invention. Fig. 2 is an end view of the furnace. Fig. 3 is a transverse section taken on the line 3 3. Fig. 4 is a transverse section taken through the exit-flues on the line 4 4. Figs. 5 and 6 are transverse sectional views illustrating modifications in details of construction.

The cylinder-shell 10 is of wrought or cast iron or steel and is made in sectional ring sections, the individual pieces of each ring being flanged on all four sides. The adjacent plates of a ring section are bolted together, as shown at 11, Fig. 3, and the several cylinder-rings are bolted together, as shown, by the joints 12, Fig. 1. Any of the plates can be removed to obtain access to the interior of the cylinder or the lining. There are as many pairs of supporting-rollers 13 as the length of the cylinder requires, and it is revolved by a worm 14, engaging with a rack-circle 15, carried by the cylinder. One of the supporting-rollers or pair of rollers is grooved, as shown at 16, and a V-ring 17, screwed on in sections, engages therewith. This holds the cylinder in position against the downward slip.

The shell has first a lining of thin tiles 20, or a lining of non-conducting material, such as asbestos. Within this there is a lining of tile flues 21, made with interfitting joints, and projections 24, fitting in grooves or recesses 23, to keep the flues 22 tight. In the present case the lining has eight of these flues running from one end of the cylinder to the other and forming fire-flues for heating the furnace; but the number of flues will depend upon the size of the cylinder and may be more or less, as desired.

The furnace is designed to be heated with gas or oil burned within the mouths of the flues 22. The attachment here shown is for gas, and in the mouth of each flue 22 there is a gas-burner 23ª. The discharge end of the cylinder is closed with a plate 24ª, carrying a fire-brick lining 25 and having openings 26, which register with the flues 22, also discharge-openings 27 for the ore just within the cylinder-lining, and a central air-inlet pipe 28. The gas-main is shown at 29. Turning freely thereon by means of a stuffing-box 30 there is a set of branch gas-pipes 31, leading to the several flue-inlets 26, each carrying a burner within the mouth of its flue. This spider-frame of gas-pipes is carried by and revolves with the cylinder, and it may be supported by the radial arms 32, extending out from a collar on the air-inlet pipe 28, or each pipe may be attached to the plate 24ª, where the burner passes through the plate. The air for the combustion enters each flue at the opening 26. At the feed end of the cylinder the fire-gases are taken off through the ports 40, opening into the annular flue 41 in a stationary ring 42. This ring is lined with fire-brick, and the flue 41 connects at the bottom by the flue 43 with the flue 44, leading to chimney. The end of the cylinder-chamber is closed with the fire-brick head 45, having the central opening 46, and abutting against this end wall is the face of a brick-lined stationary pipe 47, registering with the hole 46 and through which the gas product of the furnace passes off for subsequent treatment.

The material is fed into the furnace through the pipe 48 by means of a mechanical feed 49, the feed-pipe 48 projecting through the opening 46 in the cylinder-head.

At the discharge end of the furnace the cylinder is closed by the fire-brick-lined plate 24ª, as before mentioned, and the air or gas for the furnace-chamber enters through the central pipe 28.

If hot air or any aeriform fluid other than cold air is employed, proper connection with the inlet-pipe 28 is made for supplying the same. The discharge-openings 27 are preferably fitted with the automatically-controlled covers 50, as described in a prior application made by me.

We come now to the interior construction of the furnace-chamber. The flue-lining tiles 21 are made with grooves 60 at the joints extending parallel with the axis of the cylinder, and into these grooves are fitted the outer edges of the partition-tiles 61. These partition-tiles are made with the apertures 62 and with angular inner edges which interfit and abut against each other—that is, in the case of four radiating partitions, as here shown, the inner edge of each plate presents oblique faces meeting at a central edge and forming an angle of ninety degrees between the oblique faces. The edges of the several abutting plates meet at the center 64, and the contiguous oblique faces of the edges of the tiles fit together and mutually support each other along the center line of the cylinder. These tile partitions divide the cylinder in cross-section into quadrants, and the several apertured partitions form ore-lifters for successively elevating the ore and showering it through the apertures into the next apartment.

The ore-lifters are preferably arranged in several longitudinal sections, in the present case three in number, with unpartitioned spaces 63 and 64 therebetween, and at the feed end of the cylinder there is a short space 65 without ore-lifting plates. The first section, beginning at the discharge end of the furnace, has the ore-lifting partitions in the position shown in section in Fig. 3. The second section has them in the position shown by the partitions 61ª in Figs. 1 and 3. The third section is a counterpart of the first section. The construction and arrangement produces an intimate contact between the ore and the air or gas and it allows the removal of the ore-lifting tiles without interfering with the heating-flue tiles, and, vice versa, the latter can be renewed, as before described, without disturbing the former.

In cases where the fire-gases can be mixed with the gases produced by the chemical reaction the cylinder may be lined with a solid brick lining 70, as illustrated by Fig. 5, the heating-flues being omitted. The brick ore-lifters 71 are the same as above described except that the three sets are successively offset thirty degrees from each other, as shown by the several positions 71, 71ª, and 71ᵇ.

If the apparatus is to be used for drying at a low temperature, the heating-flues and ore-lifters may be made of cast-iron, as illustrated by Fig. 6. In this case the cast-iron lining-flues 80 have the flanges or lugs 81, to which the iron ore-lifting partitions 82 are bolted. These ore-lifting partitions are cast or made with the oblique faces along their inner edges, which interfit and mutually support each other at the center of the cylinder, as in the case of the tile partitions above described. When the plates are set, therefore, they lock each other at the center and no fastening is required for them.

The furnace-cylinder is ordinarily put up on an incline, so that the material will pass through continuously by gravity. If, however, the same material is constantly used—as, for instance, for catalytical reactions—or if the reaction requires too long a time to admit of a continuous feed and discharge, the furnace is set on a level. If it is constructed with a solid brick lining, doors can be arranged in the periphery of the cylinder for emptying the furnace.

The apparatus can with advantage also be made for treating solids with gases in cases where by chemical action superfluous heat is produced which has to be abstracted for the successful carrying out of the operation. Such cases are, for instance, the treatment of lime with chlorin gas for the manufacture of bleaching-powder; also, the treatment of carbonate of soda with carbonic-acid gas for the manufacture of bicarbonate of soda. In such cases the flues in the lining may be employed to cool the cylinder instead of heating it. The burners are omitted and cold air may be caused to circulate through them, and it will be seen that for such a purpose the pipes leading to the flues at the discharge end of the cylinder may be used to convey cold air instead of oil or gas. Further, if the iron construction illustrated by Fig. 6 is employed, water may be caused to circulate through the flues as a still more efficient cooling agent.

I claim as my invention—

1. A revolving furnace having an ore-chamber and a series of heating-flues in its periphery, with a system of fuel-burners for the respective heating-flues carried by the furnace and revolving with it, as and for the purpose set forth.

2. A revolving furnace having an ore-chamber and a series of heating-flues in its periphery, with a series of fuel-burners for the respective heating-flues carried by the furnace and revolving with it, in combination with a stationary exit-flue, for the fire-gases, registering with the heating-flues, substantially as and for the purpose set forth.

3. A revolving-cylinder furnace having a series of heating-flues in its periphery, with a system of fuel-burners for the several heating-flues carried by the furnace and revolving with it, in combination with a fuel-supply pipe connected with the said system of fuel-burners by a movable joint, substantially as and for the purpose set forth.

4. A revolving furnace having an ore-chamber divided into compartments by longitudinal partitions, and having a series of heating-flues in its periphery, with a system of fuel-burners for the several heating-flues carried by the furnace and revolving with it, in combination with a fuel-supply pipe connected with the said system of fuel-burners by a movable joint, substantially as and for the purpose set forth.

5. In a revolving-cylinder furnace, a fire-brick lining formed of blocks with longitudinal flues therethrough and longitudinal grooves in the inner face of the lining along the joints, in combination with fire-brick radial ore-lifting partitions meeting at the central axis of the cylinder and having the outer edges of the partitions seated in the said longitudinal grooves, substantially as and for the purpose set forth.

6. A revolving furnace having an ore-chamber, the longitudinal partitions dividing the chamber into compartments, and a series of heating-flues in its periphery, with a system of fuel-burners for the respective heating-flues carried by the furnace and revolving with it, in combination with a stationary exit-flue for the fire-gases registering with the ends of the heating-flues, substantially as and for the purpose set forth.

7. In a revolving-cylinder furnace, the combination of the outer shell and the fire-brick lining having a series of longitudinal heating-flues, with an end plate at the discharge end having a central air-opening for the furnace-chamber and apertures registering with the ends of the heating-flues, and a series of fuel-burners within the mouths respectively of the several flues and carried by the revolving cylinder, together with a fuel-supply pipe connected with the series of revolving fuel-burners by a movable joint, substantially as and for the purpose set forth.

8. The combination with a furnace-cylinder of a series of radial partitions having angular central abutting edges, meeting at the center of the cylinder and mutually supporting each other, substantially as and for the purpose set forth.

9. The combination, with a brick-lined cylinder having longitudinal grooves in the lining, of radial tile partitions with the outer edges of the partition-tiles seated in the grooves of the lining, and the central edges of the several tiles abutting and mutually supporting each other, substantially as and for the purpose set forth.

10. The combination with a revolving cylinder lined with tiles having longitudinal heating-channels extending through the tiles and longitudinal grooves in the inner face of the lining, of radial partitions with the outer edges of the partition-tiles seated in the grooves of the lining, and the central edges of the several partition-tiles abutting and mutually supporting each other, substantially as and for the purpose set forth.

11. A revolving furnace having radial tile partitions with the central edges of the tiles abutting and mutually supporting each other, with the partitions arranged in longitudinally-offset sections, substantially as and for the purpose set forth.

In testimony whereof I affix my signature in presence of two witnesses.

PAUL NAEF.

Witnesses:
S. B. DAVIS,
CHAS. E. TIDD.